United States Patent [19]

Kobayashi et al.

[11] Patent Number: 4,891,992
[45] Date of Patent: Jan. 9, 1990

[54] TORQUE DETECTING APPARATUS

[75] Inventors: Tadahiko Kobayashi; Masashi Sahashi; Yoichi Tokai, all of Yokohama, Japan

[73] Assignee: Kabushiki Kaisha Toshiba, Kawasaki, Japan

[21] Appl. No.: 301,121

[22] Filed: Jan. 25, 1989

[30] Foreign Application Priority Data

Jan. 26, 1988 [JP] Japan .................. 63-15256

[51] Int. Cl.⁴ .............................. G01L 3/10
[52] U.S. Cl. .................... 73/862.36
[58] Field of Search ........................ 73/862.36

[56] References Cited

U.S. PATENT DOCUMENTS 4,627,298 12/1986 Sahashi et al. .................. 73/862.36
4,750,371 6/1988 Kobayashi et al. .................. 73/
4,762,008 8/1988 Kobayashi et al.

OTHER PUBLICATIONS

Sasada et al.–"Torque Transducers with Stress-Sensitive Amorphous Ribbons . . . ", IEEE Trans. on Magn., MAG-20, No. 5, Sep. 1984, pp. 951-953.

Primary Examiner—Charles A. Ruehl
Attorney, Agent, or Firm—Oblon, Spivak, McClelland, Maier & Neustadt

[57] ABSTRACT

A torque detecting apparatus utilizing a magneto-elastic effect including a magnetic metal thin strip fixed on the circumferential surface of a torque transmitting shaft as an object of torque detection, an induced magnetic anisotropy given in advance to the magnetic metal thin strip, the induced magnetic anisotropy appearing in a direction of a principal stress produced in the magnetic metal thin strip when a torque is imposed on the torque transmitting shaft, a shape magnetic anisotropy of the magnetic metal thin strip caused by a shape of the magnetic metal thin strip, the shape magnetic anisotropy appearing in a direction forming an angle of 45° with the direction of the principal stress, and detection means for detecting a change in magnetic anisotropy produced in the magnetic metal thin strip by a torque imposed on the torque transmitting shaft.

16 Claims, 5 Drawing Sheets

TORQUE DETECTING APPARATUS

BACKGROUND OF THE INVENTION

1. Field of the Invention

The present invention relates to a torque detecting apparatus for monitoring the magnitude of a torque imposed on a torque transmitting shaft such as a rotational drive shaft of an electric motor or a vehicle by utilizing a magnetoelastic effect of a magnetic metal and, more particularly, to a torque detecting apparatus which is less influenced by noise or a disturbance magnetic field.

2. Description of the Related Art

A torque is very effective as a fundamental parameter for controlling or monitoring a rotational drive section of an electric motor, a vehicle, or the like.

In order to accurately detect the magnitude of a torque imposed on a torque transmitting shaft with high reliability, detection must be performed in a non-contact manner with respect to the torque transmitting shaft. In order to meet this requirement, a torque detecting apparatus utilizing a magnetoelastic effect produced in an amorphous magnetic alloy has been proposed (Papers Tec. Meet. Magnetics, IEEJ, MAG-81-72). The principle of this torque detecting apparatus will be described below with reference to FIG. 1.

In FIG. 1, reference numeral 1 denotes a torque transmitting shaft. Annular thin strip 2 formed of an amorphous magnetic alloy is wound around and fixed to torque transmitting shaft 1. Induced magnetic anisotropy Ku0 is given to annular thin strip 2 in a direction inclined at inclination angle $\theta$ ($\theta = 0$) from circumferential direction 3. For the sake of descriptive simplicity, assume that $90° > \theta > 45°$, and saturated magnetostriction constant $\lambda s > 0$. Note that examples of a magnetic metal constituting annular thin strip 2 include ones exhibiting soft magnetism such as an amorphous magnetic alloy, Permalloy (Fe-Ni alloy), Sendust (Fe-Al-Si alloy), and the like.

Assuming that torque 5 is imposed on torque transmitting shaft 1, surface stress o produced on torque transmitting shaft 1 is transmitted to annular thin strip 2. As a result, tension o is produced in annular thin strip 2 in a $+45°$ direction, and compressive stress $-\tau$ is produced in a $-45°$ direction. The magnetoelastic effect due to this stress causes an induced magnetic anisotropy Ku1 along the $+45°$ direction with reference to the circumferential direction of annular thin strip 2. Note that the magnitude of Ku1 is represented by $Ku1 = 3\lambda\sigma$.

As a result, the total magnetic anisotropy exhibited by annular thin strip 2 is changed to a resultant force of magnetic anisotropy Ku0 given in advance and induced magnetic anisotropy Ku1 caused by the magnetoelastic effect, i.e., to Ku2 shown in FIG. 1. By detecting the change in magnetic anisotropy, the stress produced in annular thin strip 2, i.e., a torque imposed on torque transmitting shaft 1 can be detected.

As a means for detecting the change in magnetic anisotropy in annular thin strip 2, a detection coil is conventionally used. The function of the detection coil is as follows. In general, magnetic permeability $\mu$ of a magnetic substance is changed according to the magnetic anisotropy of the substance with respect to a direction of magnetic excitation. Therefore, when the magnetic anisotropy of annular thin strip 2 is changed, magnetic flux density B in the annular thin strip is changed in accordance with the relation $B = \mu H$. As a result, an electromotive force corresponding to the change in magnetic anisotropy of the annular thin strip is produced in a detection coil (not shown) arranged near annular thin strip 2. The electromotive force can be easily measured by a detection circuit connected to the two terminals of the detection coil. Therefore, the change in magnetic anisotropy in annular thin strip 2 and the magnitude of a torque imposed on torque transmitting shaft 1 can be detected on the basis of a change in voltage across the detection coil terminals. In this manner, a torque detecting apparatus of this type comprises an annular thin strip as a primary sensor, and a detection coil as a secondary sensor.

The torque detecting apparatus described above has the following problems.

The magnetic anisotropy of annular thin strip 2 which is the primary sensor is also changed by the influences of magnetic noise or a disturbance magnetic field present in an environment where the thin strip is arranged. As described above, the torque detecting apparatus shown in FIG. 1 operates under the assumption that the change in magnetic anisotropy of annular thin strip 2 corresponds to the magnitude of the torque imposed on torque transmitting shaft 1. Therefore, the influence of magnetic noise considerably impairs detection precision. The disturbance magnetic field or noise can be produced in various directions due to various factors, for example a DC magnetic field along the axial direction of the torque transmitting shaft, a DC magnetic field along the circumferential direction of the torque transmitting shaft, and the like.

This problem disturbs applications on various electric systems mounted on a vehicle, such as a power steering system, a transmission control system, an engine control system, and the like, which have been increasingly developed in recent years. Note that the cause of the disturbance magnetic field includes a magnet, a motor, an electromagnetic clutch, and the like present nearby. When a current flows through the torque transmitting shaft, the current also causes a disturbance magnetic field along the circumferential direction of the torque transmitting shaft.

SUMMARY OF THE INVENTION

It is an object of the present invention to allow a torque detecting apparatus, having a magnetic metal thin strip attached to the circumferential surface of a torque transmitting shaft as a primary sensor, for detecting the magnitude of a torque imposed on the torque transmitting shaft on the basis of a magneto-elastic effect produced in the thin strip, to eliminate the influence caused by magnetic noise or a disturbance magnetic field and to perform torque detection with high precision.

In order to achieve the above object, there is provided a torque detecting apparatus comprising:

a magnetic metal thin strip fixed on the circumferential surface of a torque transmitting shaft as an object of torque detection;

an induced magnetic anisotropy given in advance to the magnetic metal thin strip, the induced magnetic anisotropy appearing in a direction of a principal stress produced in the magnetic metal thin strip when a torque is imposed on the torque transmitting shaft;

a shape magnetic anisotropy of the magnetic metal thin strip caused by a shape of the magnetic metal thin strip, the shape magnetic anisotropy appearing in a direction forming an angle of 45° with the direction of the principal stress; and detection means for detecting a change in magnetic anisotropy produced in the magnetic metal thin strip by a torque imposed on the torque transmitting shaft.

In the torque detecting apparatus of the present invention, since the magnetic metal thin strip has the shape magnetic anisotropy, the influence of the disturbance magnetic field can be suppressed.

The shape magnetic anisotropy means that a magnetic material piece has a direction along which it is easily magnetized and a direction along which it is difficult to be magnetized in accordance with its shape. For example, a needle-like iron piece is easily magnetized in its axial direction, and is difficult to be magnetized in a direction perpendicular thereto. The direction of the shape magnetic anisotropy is represented by a direction along which a magnetic material piece is easily magnetized.

In the following description, a principal stress direction means a direction of principal stress produced in the magnetic thin strip when the torque is imposed on the torque transmitting shaft.

DETAILED DESCRIPTION OF THE PREFERRED EMBODIMENT

Considering a shape form effect of a magnetic metal, the present inventors performed the following simulation.

A model used in this simulation will be explained below with reference to FIGS. 2A to 2C. Note that in this model, a DC bias magnetic field (corresponding to magnetic noise) and a excitation magnetic field are imposed in the axial direction of a torque transmitting shaft. Therefore, parameters in FIGS. 2A to 2C are represented by angles with respect to the axial direction of the torque transmitting shaft.

Figure 2A:
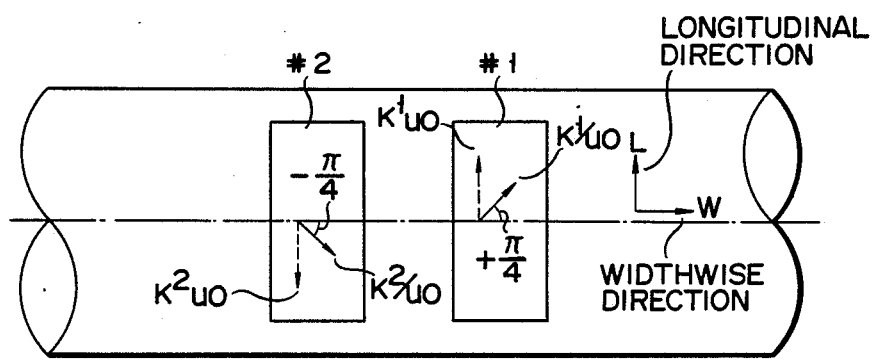
FIGS. 2A to 2C are views showing models used for simulating output characteristics of a torque detecting apparatus according to the present invention.
Figure 2B:
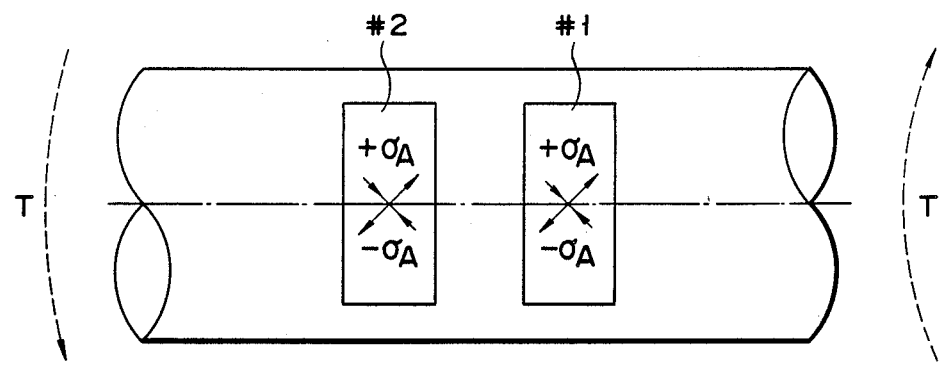
Figure 2C:
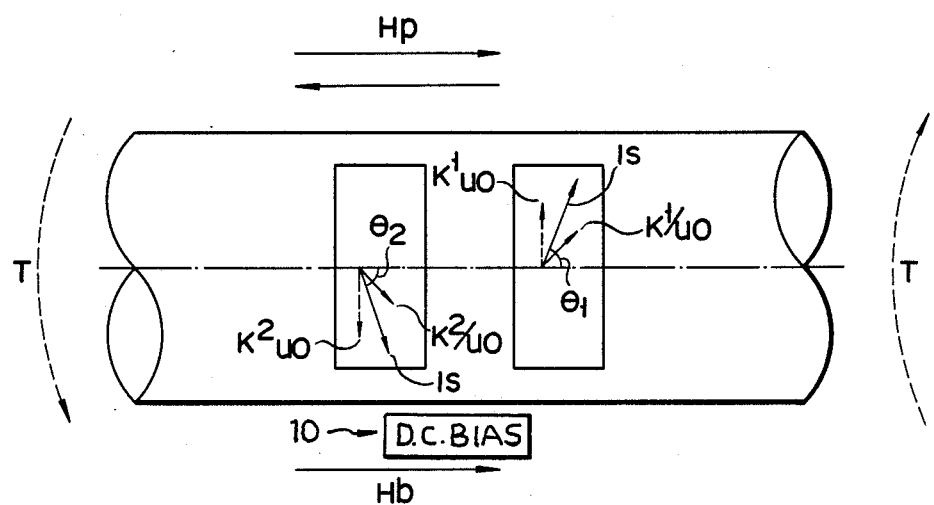

In FIG. 2A, a pair of magnetic metal thin strips #1 and #2 are fixed on the circumferential surface of the torque transmitting shaft. As shown in FIG. 2A, magnetic metal thin strips #1 and #2 have a rectangular ribbon shape. Magnetic metal thin strips #1 and #2 are provided with induced magnetic anisotropies having induced magnetic anisotropy constants $K^1u0$ and $K^2u0$, respectively, along the principal stress direction (a +45° or −45° direction with respect to the axial direction of the torque transmitting shaft) by a magnetic annealing or a heat treatment in a magnetic field. In addition, magnetic metal thin strips #1 and #2 have shape magnetic anisotropies having shape magnetic anisotropy constants $K^{1'}u0$ and $K^{2'}u0$ based on their rectangular shape. As shown in FIG. 2A, each shape magnetic anisotropy has a direction along the long sides of the corresponding rectangular magnetic metal thin strip. The direction of the shape magnetic anisotropy can be generally defined as a 45° direction with respect to the principal stress direction, as described in the appended claims. The magnitude of the shape magnetic anisotropy changes in accordance with a ratio of the length of the long sides to that of the short sides.

Figure 1:
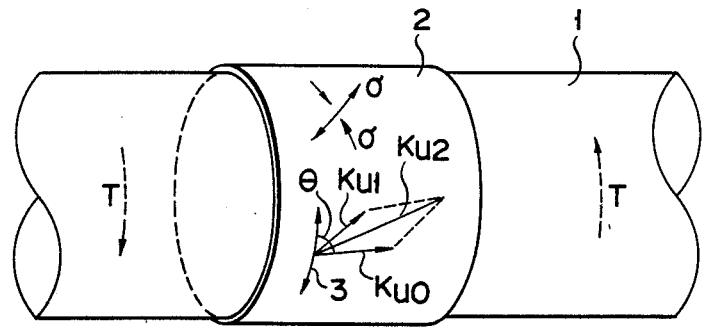
FIG. 1 is a view for explaining the principle of a conventional torque detecting apparatus.

The reason why the ribbon-shaped magnetic metal thin strips are used in place of annular thin strip 2 shown in FIG. 1 is as follows. That is, annular thin strip 2 is formed by bending a ribbon-shaped thin strip provided with a predetermined magnetic anisotropy in advance in correspondence with the curvature of torque transmitting shaft 1. Since a new magnetic anisotropy appears due to a stress during deformation, magnetic anisotropy $Ku0$ given in advance is degraded. On the other hand, it is very difficult for the thin strip which has been shaped annular to be given magnetic anisotropy $Ku0$. In contrast to this, the magnetic anisotropy $Ku0$ is easily introduced into the ribbon-shaped magnetic metal thin strip by a magnetic annealing. Further, the ribbon-shaped magnetic metal thin strips partially cover the circumferential surface of the torque transmitting shaft can suppress degradation of induced magnetic anisotropy $Ku0$ given in advance since it suffers from smaller deformation during mounting. However, it is known to those who are skilled in the art to use such a ribbon-shaped magnetic metal thin strip as a primary sensor.

The pair of magnetic metal thin strips #1 and #2 are used since torques in positive and negative directions are detected with good linearity. When only one primary sensor having a direction of the induced magnetic anisotropy corresponding to $+\theta$ or $-\theta$ is used, the torques in the positive and negative directions cause the magnitude of detection outputs to vary even when a torque having the same absolute value is imposed. In contrast to this, when the pair of primary sensors and a pair of corresponding detection coils are used and the pair of detection coils are differentially connected, a detection output having excellent linearity from the positive direction to the negative direction can be obtained.

As shown in FIG. 2B, when torque T is imposed on the torque transmitting shaft, in each of magnetic metal thin strips #1 and #2, tensile stress $+\sigma A$ and compressive stress $-\sigma A$ are produced in the principal stress direction, i.e., in a +45° direction and a −45° direction, respectively.

FIG. 2C shows a model when torque T imposed as described above is detected. Assume that alternate magnetic field $\pm H_p$ is imposed along the axial direction of the torque transmitting shaft in order to excite a detection coil (not shown), and DC bias magnetic field $H_b$ imposed by D.C. biasing means 10 is present along the axial direction of a prospective disturbance magnetic field. The directions of saturation magnetization $I_s$ in magnetic metal thin strips #1 and #2 are respectively represented by $\theta_1$ and $\theta_2$ with respect to the axial direction of the torque transmitting shaft.

The simulation performed based on the abovementioned models will be described below.

Magnetic energies of magnetic metal thin strips #1 and #2 are defined by the following equations. In these equations, $E_1^{++}$ and $E_2^{+}$ are the magnetic energies when an excitation magnetic field is $+H_p$, and $E_1^{-}$ and $E_2^{-}$ 2 are the magnetic energies when an excitation magnetic field is $-H_p$. Note that $N_W$ is the demagnetizing factor in the widthwise direction of the magnetic metal thin strip, and $N_L$ is the demagnetizing factor in the longitudinal direction of the magnetic metal thin strip.

Therefore, a ratio of $N_W$ to $N_L$ represents the shape magnetic anisotropy of the magnetic metal thin strip.

$$E_1^{+} = -I_S(H_b + H_p)\cos\theta_1^{+} + K'u1\sin^2\{\theta^{+} - (\pi/4)\} + \quad \#1$$
$$(\tfrac{1}{2})N_W I_S^2\cos^2\theta_1^{+} + (\tfrac{1}{2})N_L I_S^2\cos^2\theta_1^{+}$$

$$E_1^{-} = -I_S(H_b + H_p)\cos\theta_1^{-} + K'u1\sin^2\{\theta^{-} - (\pi/4)\} +$$
$$(\tfrac{1}{2})N_W I_S^2\cos^2\theta_1^{-} + (\tfrac{1}{2})N_L I_S^2\cos^2\theta_1^{-}$$

$$E_2^{+} = -I_S(H_b + H_p)\cos\theta_2^{+} + K'u2\sin^2\{\theta^{+} - (\pi/4)\} + \quad \#2$$
$$(\tfrac{1}{2})N_W I_S^2\cos^2\theta_2^{+} + (\tfrac{1}{2})N_L I_S^2\cos^2\theta_2^{+}$$

$$E_2^{-} = -I_S(H_b + H_p)\cos\theta_2^{-} + K'u2\sin^2\{\theta^{-} - (\pi/4)\} +$$
$$(\tfrac{1}{2})N_W I_S^2\cos^2\theta_2^{-} + (\tfrac{1}{2})N_L I_S^2\cos^2\theta_2^{-}$$

The first, second, third, and fourth terms in the right side in each equation respectively represent the following energy terms:
- First term: magnetostatic energy term of magnetic metal thin strip
- Second term: energy term based on induced magnetic anisotropy
- Third & fourth terms: energy terms based on shape magnetic anisotropy $K'u1$ and $K'u2$ satisfy the following equations, respectively:

$$K'u1 = K^1u0 + 3\lambda s\sigma A$$

$$K'u2 = K^2u0 - 3\lambda s\sigma A$$

By solving the differential equation of $dE/d\theta = 0$ for the above equations, angle $\theta$ minimizing the magnetic energy can be obtained. The output from the torque detecting apparatus in the above-mentioned model is expressed by the following equation:

$$V_{out} = I_S(\cos\theta_1^{+} - \cos\theta_1^{-}) - I_S(\cos\theta_2^{+} - \cos\theta_2^{-})$$

Based on the above-mentioned theory, a change in output when DC bias magnetic field $H_b$ corresponding to a disturbance magnetic field was changed was simulated.

In this simulation, the following conditions were set.
- Diameter of torque transmitting shaft: 20 mm
- Excitation magnetic field $H_p$: 0.09 Oe
- Torque T: 1 kg·m In order to examine the shape effect of the magnetic metal thin strip, the ratio of demagnetizing factor $N_W$ to $N_L$ was used as a parameter, and $N_W:N_L$ was changed within the range of 10:1 to 1:2 under the condition of $4\pi(N_W + N_L) = 0.1$.

Figure 5:
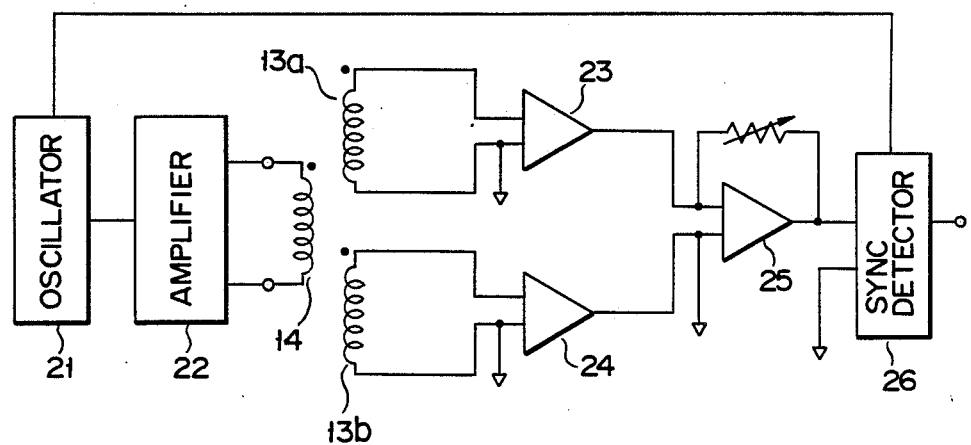
FIG. 5 is a block diagram showing a circuit arrangement of the torque detecting apparatus in the embodiment shown in FIG. 4.

FIG. 5 shows the simulation results. FIG. 5 reveals:

(I) When $N_W:N_L = 1:1$

The size in the longitudinal direction of the magnetic metal thin strip is equal to that in the widthwise direction. In this case, if DC bias magnetic field $H_b$ is zero, the absolute value of the output is large. However, the output value largely changes depending on bias magnetic field $H_b$, and this indicates that the influence of the disturbance magnetic field is conspicuous.

(II) When $N_W:N_L$ falls in the range of 2:1 to 10:1

This magnetic metal thin strip has a rectangular shape, and is fixed having its longitudinal direction aligned along the circumferential direction of the torque transmitting shaft. In this case, the output when DC bias magnetic field $H_b$ is zero is decreased below case (I). However, upon application of DC bias magnetic field $H_b$, the absolute value of the output is increased, and forms a peak at certain $H_b$. In addition, the output curve is relatively moderate, and has a flat region on its peak portion. This indicates that the dependency on bias magnetic field $H_b$ is small, and this magnetic metal thin strip is not easily influenced by the disturbance magnetic field.

(III) When $N_W:N_L = 2:3$ or $1:2$

This magnetic metal thin strip has a rectangular shape, and is fixed having its longitudinal direction aligned along the axial direction of the torque transmitting shaft. In this case, the output from the torque detecting apparatus linearly decreases upon an increase in DC bias magnetic field $H_b$. This indicates that a resistance against the disturbance magnetic field is low.

Figure 3:
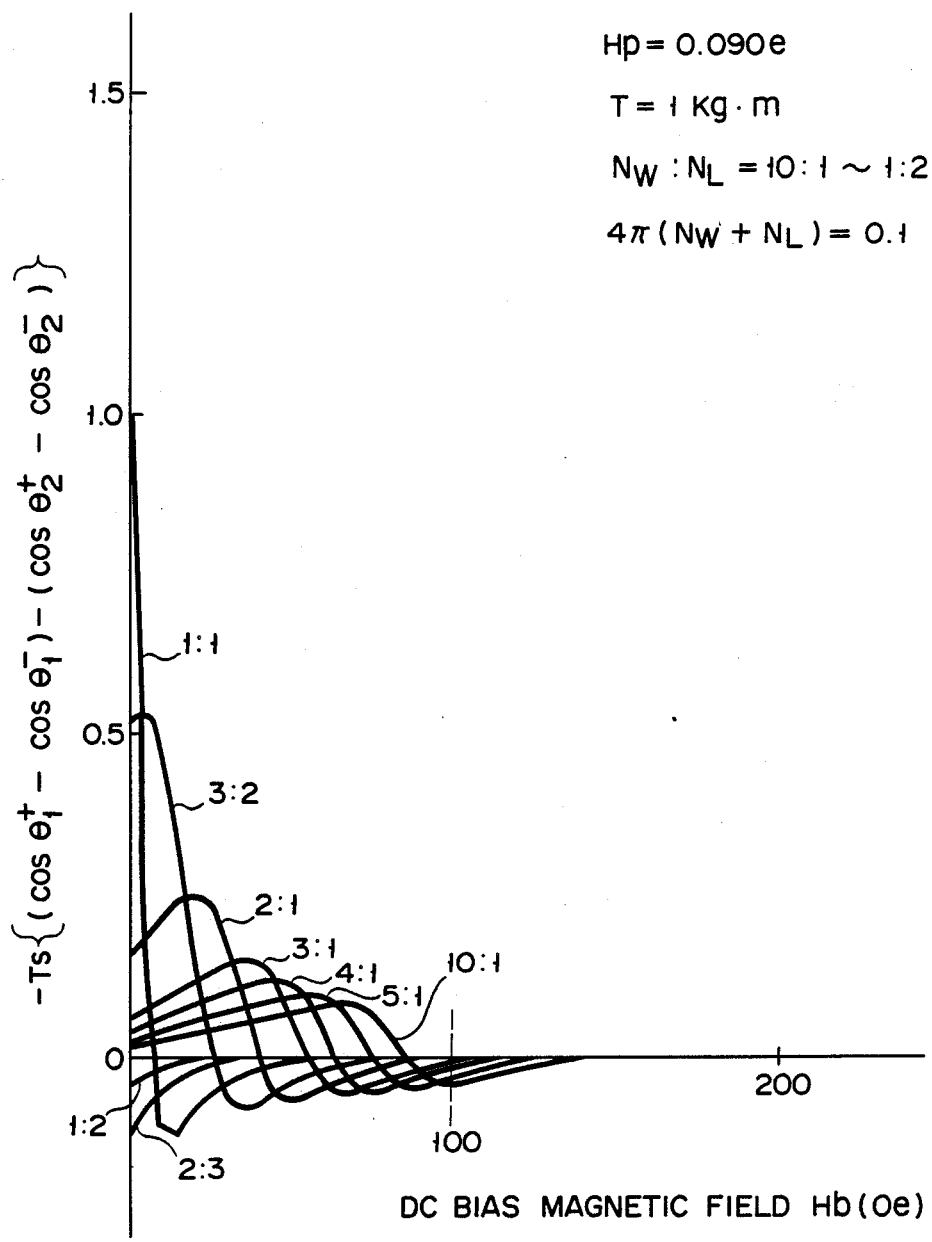
FIG. 3 is a graph showing results obtained by the simulation based on the models shown in FIGS. 2A to 2C.

The above-mentioned simulation results lead to the following conclusion. When the disturbance magnetic field is imposed in the axial direction of the torque transmitting shaft, the magnetic metal thin strip is formed to have an elongated shape so that the dimension in the longitudinal direction is about twice that in the widthwise direction, and is fixed having its longitudinal direction aligned along the circumferential direction of the torque transmitting shaft, thereby effectively suppressing the influence of the disturbance magnetic field. If torque detection is performed in a state wherein a predetermined DC bias magnetic field is imposed so tat measurement can be performed at peak portions of curves shown in FIG. 3, more stable torque detection can be assured.

Based on this conclusion, a similar induction can be made when the disturbance magnetic field is imposed in a direction perpendicular to the axial direction of the torque transmitting shaft. More specifically, in this case, the magnetic metal thin strip similarly has an elongated shape, and is fixed having its longitudinal direction aligned along the axial direction of the torque transmitting shaft, so that the influence of the disturbance magnetic field can be effectively suppressed.

The same effect can be obtained when alternate magnetic field $\pm H_p$ is imposed in the circumferential direction of the torque transmitting shaft in order to excite the detection coil. In this case, the shape magnetic anisotropy along the axial direction of the torque transmitting shaft is given to the magnetic metal thin strips #1 and #2, thereby obtaining a resistance against the disturbance magnetic field in the axial direction. Note that as a means for exciting the detection coil in the circumferential direction of the torque transmitting shaft, a magnetic head disclosed in, e.g., U.S. Pat. No. 4,762,008 can be used.

A torque detecting apparatus according to an embodiment of the present invention with the arrangement based on the simulation results will now be described.

Figure 4:
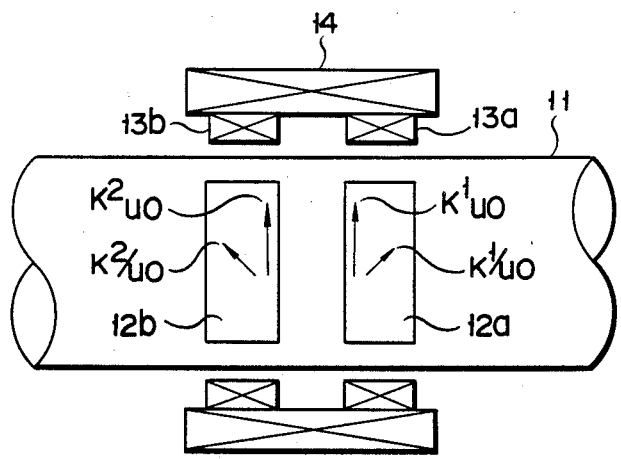
FIG. 4 is a view showing an embodiment of a torque detecting apparatus according to the present invention.

FIG. 4 is a schematic view showing an embodiment of the torque detecting apparatus according to the present invention, and FIG. 5 is a block diagram showing its circuit arrangement.

In FIG. 4, reference numeral 11 denotes a torque transmitting shaft. The torque transmitting shaft is made of a ferromagnetic material such as S45C, and has a diameter of 20 mm. A pair of magnetic metal thin strips 12a and 12b of an amorphous alloy as primary sensors are fixed to the circumferential surface of torque transmitting shaft 11. Each of magnetic metal thin strips 12a and 12b has an elongated rectangular shape having a width of 4 mm and a length of 30 mm, and has a thickness of 20 μm. Magnetic metal thin strips 12a and 12b are sliced from an amorphous magnetic alloy thin film having the following composition and manufactured by a single roll method.

$(Fe_{0.2}Co_{0.8})_{78}Si_8B_{14}$

Predetermined induced magnetic anisotropies $K^1u0$ and $K^2u0$ are given to magnetic metal thin strips 12a and 12b by a magnetic annealing or a heat treatment in a magnetic field before they are attached to torque transmitting shaft 11. The directions of these induced magnetic anisotropies $K^1u0$ and $K^2u0$ respectively correspond to +45° and −45° directions with respect to the circumferential direction of torque transmitting shaft 11. Shape magnetic anisotropies $K^{1'}u0$ and $K^{2'}u0$ are respectively given to magnetic metal thin strips 12a and 12b by the elongated rectangular shape effect. The directions of these shape magnetic anisotropies correspond to a 45° direction (in this case, the circumferential direction of torque transmitting shaft 11) with respect to the principal stress direction produced in the surface when a torque is imposed. Note that the magnitudes of induced magnetic anisotropies $K^1u0$ and $K^2u0$ and shape magnetic anistropies $K^{1'}u0$ and $K^{2'}u0$ are as follows:

$K^1u0$, $K^2u0$: $1 \times 10^4$ erg/cm$^3$ $K^{1'}u0$, $K^{2'}u0$: $1 \times 10^5$ erg/cm$^3$ In the torque detecting apparatus of this embodiment, cylindrical detection coils 13a and 13b as secondary sensors are provided to amorphous magnetic metal thin strips 12a and 12b in a non-contact manner. These detection coils 13a and 13b are arranged to surround torque transmitting shaft 11, and are located above corresponding magnetic metal thin strips 12a and 12b. Furthermore, cylindrical excitation coil 14 for exciting these detection coils is arranged outside detection coils 13a and 13b. Each of detection coils 13a and 13b and excitation coil 14 is obtained by winding a copper wire having a wire diameter of 0.3 mm around a non-magnetic piece frame (not shown). The number of turns is 100 for detection coils 13a and 13b, and 300 for excitation coil 14.

As shown in FIG. 5, the torque detecting apparatus of this embodiment has oscillator 21. Oscillator 21 produces a sine-wave excitation current of 10 kHz. The excitation current is amplified by amplifier 22, and is imposed to excitation coil 14. As a result, since excitation coil 14 is excited, detection coils 13a and 13b and magnetic metal thin strips 12a and 12b are placed in the alternate magnetic field (excitation magnetic field $H_p$), thus forming a torque detection enable state. In this state, when the torque is imposed and the magnetic anisotropies of magnetic metal thin strips 12a and 12b are changed, changes in voltage occur in detection coils 13a and 13b by a change in magnetic permeability. The changes in voltage are supplied to sync detector 26 through differential amplifiers 23, 24, and 25, and are rectified. Thus, a DC torque detection signal which changes according to a change in torque can be obtained.

Figure 6:
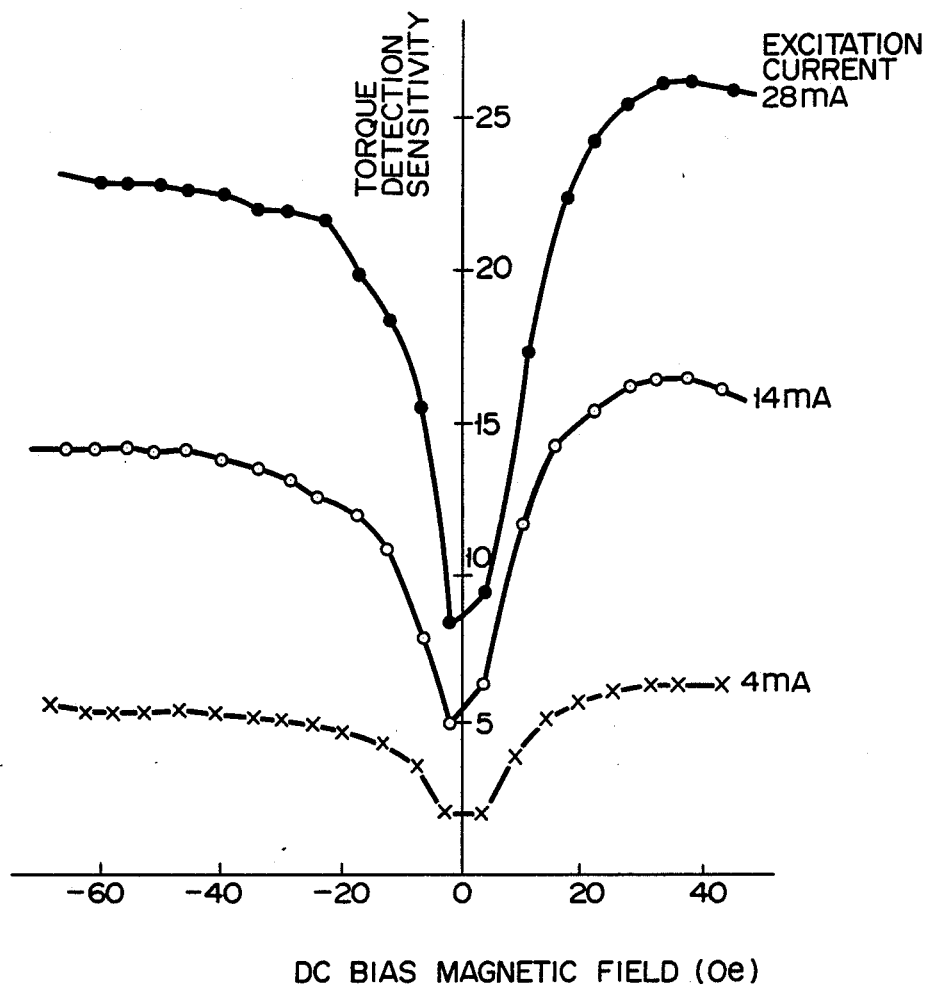
FIG. 6 is a graph showing dependency of detection sensitivity of a torque detecting apparatus shown in FIGS. 4 and 5 on a DC bias magnetic field.

Finally, an experiment will be explained wherein torque detection was carried out in practice using the above-mentioned torque detecting apparatus, and the influence of the disturbance magnetic field was examined. In this experiment, the entire system shown in FIG. 4 was housed in a cylindrical coil, and a DC current was flowed through the coil to impose a DC bias magnetic field (corresponding to disturbance) along the axial direction of the torque transmitting shaft. By changing the magnitude of the bias magnetic field, a change in torque detection sensitivity at a predetermined excitation voltage was examined. FIG. 6 shows the examination results.

As apparent from FIG. 6, when the absolute value of the DC bias magnetic field along the axial direction of torque transmitting shaft 11 exceeds about 20 Oe, the torque detection sensitivity is increased, and its variation is minimized. Therefore, when a torque is detected using the apparatus of this embodiment, a predetermined bias magnetic field of 20 Oe or more is preferably imposed in advance. Thus, when the disturbance magnetic field is imposed, a variation in detection sensitivity caused thereby can be minimized.

The experimental results support the simulation results, and reveal that the torque detecting apparatus of this embodiment is less influenced by the disturbance magnetic field and the stable detection output can be obtained.

The above description is associated with an embodiment wherein a rectangular magnetic metal thin strip is used as a primary sensor as shown in FIGS. 2A to 2C and FIG. 4. However, the present invention can be similarly applied to a case wherein annular thin strip 2 is used as a primary sensor like in the related art shown in FIG. 1. In this case, the shape magnetic anisotropy of annular thin strip 2 can be controlled by changing a ratio of its diameter to its width.

What is claimed is:

1. A torque detecting apparatus comprising:
   a magnetic metal thin strip fixed on the circumferential surface of a torque transmitting shaft as an object of torque detection;
   an induced magnetic anisotropy given in advance to said magnetic metal thin strip, said induced magnetic anisotropy appearing in a direction of a principal stress produced in said magnetic metal thin strip when a torque is imposed on said torque transmitting shaft;
   a shape magnetic anisotropy of said magnetic metal thin strip caused by a shape of said magnetic metal thin strip, said shape magnetic anisotropy appearing in a direction forming an angle of 45° with the direction of the principal stress; and
   detection means for detecting a change in magnetic anisotropy produced in the magnetic metal thin strip by a torque imposed on the torque transmitting shaft.

2. An apparatus according to claim 1, wherein a pair of said magnetic metal thin strips are provided, and directions of said induced magnetic anisotropies given to said magnetic metal thin strips are symmetrical about the direction of the principal stress.

3. An apparatus according to claim 2, wherein said pair of magnetic metal thin strips have a ribbon shape.

4. An apparatus according to claim 1, wherein said detection means comprises a detection coil arranged near said magnetic metal thin strip, and an excitation coil for exciting said detection coil, said excitation coil forming an alternate magnetic field including said magnetic metal thin strip and said detection coil, and said detection coil detecting a change in magnetic permeability caused by a change in magnetic anisotropy of said magnetic metal thin strip as a change in terminal voltage of said detection coil.

5. An apparatus according to claim 4, wherein said excitation coil forms an alternate magnetic field along an axial direction of said torque transmitting shaft.

6. An apparatus according to claim 5, wherein a pair of said magnetic metal thin strips are provided, and directions of said induced magnetic anisotropies given to said magnetic metal thin strips are symmetrical about the direction of the principal stress.

7. An apparatus according to claim 6, wherein said pair of magnetic metal thin strips have a ribbon shape.

8. An apparatus according to claim 1, wherein said magnetic metal is an amorphous alloy.

9. A torque detecting apparatus comprising:
a magnetic metal thin strip attached fixed on the circumferential surface of a torque transmitting shaft as an object of torque detection;
an induced magnetic anisotropy given in advance to said magnetic metal thin strip, said induced magnetic anisotropy appearing in a direction of a principal stress produced in said magnetic metal thin strip when a torque is imposed on said torque transmitting shaft;
a shape magnetic anisotropy of said magnetic metal thin strip caused by a shape of said magnetic metal thin strip, said shape magnetic anisotropy appearing in a direction forming an angle of 45° with the direction of the principal stress;

detection means for detecting a change in magnetic anisotropy produced in the magnetic metal thin strip by a torque imposed on the torque transmitting shaft; and
means for imposing a predetermined DC bias magnetic field in the same direction as that of a prospective disturbance magnetic field.

10. An apparatus according to claim 9, wherein a pair of said magnetic metal thin strips are provided, and directions of said induced magnetic anisotropies given to said magnetic metal thin strips are symmetrical about the direction of the principal stress.

11. An apparatus according to claim 10, wherein said pair of magnetic metal thin strips have a ribbon shape.

12. An apparatus according to claim 9, wherein said detection means comprises a detection coil arranged near said magnetic metal thin strip, and an excitation coil for exciting said detection coil, said excitation coil forming an alternate magnetic field including said magnetic metal thin strip and said detection coil, and said detection coil detecting a change in magnetic permeability caused by a change in magnetic anisotropy of said magnetic metal thin strip as a change in terminal voltage of said detection coil.

13. An apparatus according to claim 12, wherein said excitation coil forms an alternate magnetic field along an axial direction of said torque transmitting shaft.

14. An apparatus according to claim 13, wherein a pair of said magnetic metal thin strips are provided, and directions of said induced magnetic anisotropies given to said magnetic metal thin strips are symmetrical about the direction of the principal stress.

15. An apparatus according to claim 14, wherein said pair of magnetic metal thin strips have a ribbon shape.

16. An apparatus according to claim 9, wherein said magnetic metal is an amorphous alloy.

* * * * *